Figure 1:
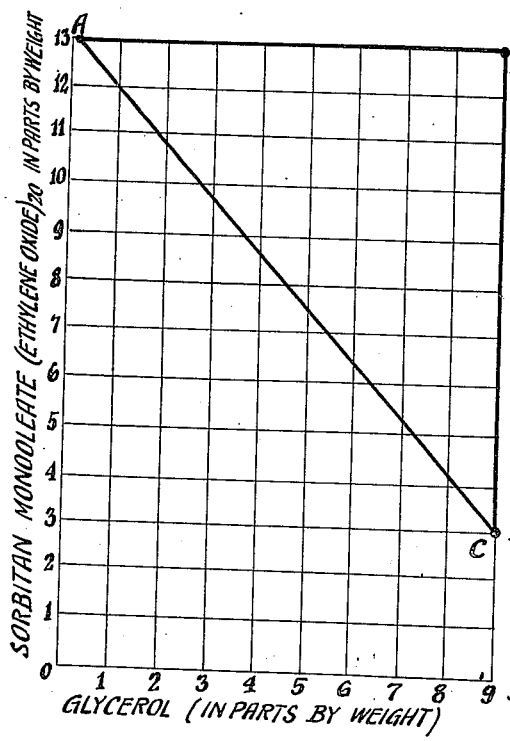

INVENTORS
Charles J. Kern
Thomas Antoshkiw
Michael R. Maiese
BY
Lewis H. Baer
ATTORNEY Patented Jan. 29, 1952

UNITED STATES PATENT OFFICE 2,583,576

CLEAR AQUEOUS SOLUTIONS OF OLEAGINOUS COMPOSITIONS

Charles J. Kern, Long Island City, Thomas Antoshkiw, Stapleton, and Michael R. Maiese, Brooklyn, N. Y., assignors to American Home Products Corporation, New York, N. Y., a corporation of Delaware Application December 11, 1948, Serial No. 64,895

13 Claims. (Cl. 167—81)

This invention relates to the preparation of water-soluble compositions containing lipoid-soluble and oleaginous ingredients.

Compositions containing appreciable amounts of oleaginous materials must often be solubilized or at least finely dispersed in an aqueous medium. For example, in the pharmaceutical art it is often necessary to prepare compositions having an appreciable content of lipoid-soluble substances and/or oils which must be used in an aqueous medium. Specifically, many compositions intended for throat and nasal sprays must first be dissolved in relatively large amounts of water prior to use and often these compositions contain substantial amounts of water-insoluble and oleaginous ingredients. Again, vitamin preparations containing the known lipoid-soluble vitamins must often be solubilized in an aqueous medium such as water, milk, fruit juice, etc., particularly for infant feeding. These obviously represent but a few examples where oily or lipoid-soluble compositions are used in an essentially aqueous medium.

This invention is concerned with the preparation of compositions containing normally water-insoluble ingredients having the characteristics of being stable, clear solutions which can be easily and quickly solubilized in an aqueous medium. By the terms "solutions" and "solubilized," it is intended to cover apparent solutions which are stable and which visually appear to be clear solutions to the naked eye. The solutions produced by this invention are clear and remain clear indefinitely.

Giving specific consideration to such pharmaceutical compositions as vitamin preparations, these compositions may contain the lipoid-soluble vitamins A, D, E and K, either singly or in selected admixtures. As can be shown, when these vitamins are present, the composition will usually contain substantial amounts of oily material. Thus, it is well known that while the lipoid-soluble vitamins can now be obtained synthetically, these vitamins are usually obtained from vegetable, animal or marine sources. For example, vitamins A and D are obtainable from fish liver oils and animal fats while vegetable oils are a rich source of vitamins E and K. Prior to the discoveries leading to the synthesis of these lipoid-soluble vitamins, specific fish liver and vegetable oils, oil concentrates and other high potency oil fractions served to supply these lipoid-soluble vitamins in the preparation of various vitamin compositions. Thus, such preparations must of necessity contain appreciable amounts of oil. As a matter of fact, it is well-recognized that certain synthetically prepared vitamins such as vitamin $D_2$ or $D_3$ should be solubilized in vegetable oil in order to preserve their stability. It is believed that this is also true of vitamin A and its various esters which are considered quite unstable under normal atmospheric conditions.

As specific examples of oils which may be present in the composition, the fish liver oils which have been mentioned above would cover such oils as shark liver oil, cod liver oil, halibut liver oil, tuna liver oil, etc., all of these involving generally high potency fractions of vitamins A and D. Other fish liver oils of lower vitamin potency may of course be used. Special high vacuum oil fractions of very high vitamin potency rich in vitamin A esters may also be used. In addition, the compositions may comprise vegetable oils such as corn oil, coconut oil, cottonseed oil, wheat germ oil, peanut oil, rice bran oil, sesame seed oil or in fact any oil containing fatty acid glycerides which is generally useful or necessary in compositions for medicinal or other purposes.

It has been discovered that despite the presence of substantially water-insoluble, oily ingredients, sparklingly clear compositions may be prepared which demonstrate an ability to go into solution in an aqueous medium to an unlimited extent.

In order to obtain compositions having suitable stability, viscosity, clarity and solubility in water, it has been found that there must be present in the composition three essential ingredients besides the oil component, namely, a polyalkylene oxide derivative of a partial higher fatty acid ester of a polyhydric alcohol, specifically a polyethylene oxide derivative of sorbitan monooleate; a sugar such as glucose, dextrose, maltose or sucrose including mixtures thereof or a polyhydric alcohol such as sorbitol, mannitol or glycerol but, of all of these, preferably glycerol; and water. The partial ester to be used in the composition is believed to have the following formula:

$$\begin{array}{l} \phantom{O}\text{CH}_2 \\ \phantom{O}| \\ \phantom{O}\text{HCO(CH}_2\text{CHO)}_a\text{·CH}_2\text{·CH}_2\text{OH} \\ \text{O} \\ \phantom{O}\text{HCO(CH}_2\text{CHO)}_b\text{·CH}_2\text{·CH}_2\text{OH} \\ \phantom{O}| \\ \phantom{O}\text{C} \\ \phantom{O}| \\ \phantom{O}\text{HCO(CH}_2\text{CHO)}_c\text{·CH}_2\text{·CH}_2\text{OH} \\ \phantom{O}| \\ \phantom{O}\text{H}_2\text{COOC}_{18}\text{H}_{33} \end{array}$$

$$a+b+c=17$$

and may also be identified as sorbitan monooleate (ethylene oxide)$_{20}$.

The sorbitan derivative, while recognized as a solubilizing agent, is not in itself sufficient to produce a composition having all of the above-mentioned characteristics when dealing with oils. While excessively large amounts may solubilize certain oils either under normal conditions or by heating, the composition lacks the proper clarity and viscosity and, of course, a high percentage of this agent results in a composition having an objectionable taste. It has been found that viscosity, solubility, and clarity are governed by the sorbitan derivative-oil ratio and also by the proper ratio of glycerine and water as compared to it.

In order to more clearly illustrate the interdependence of the various ingredients in order to achieve the desired characteristics, attention is now called to the drawing.

Fig. 1 illustrates the proportions of sorbitan derivative and glycerol required to achieve clear compositions, on the basis of one part by weight of oil in the composition.

As can be seen, Fig. 1 discloses a graph in which the abscissa represents the parts by weight of glycerine while the ordinate represents the parts by weight of partial ester. The lines A, B and C outline a triangular area. From this graph one may find the proper ratios of glycerine and ester, based on one part by weight of oil, which will result in clear compositions having the desired viscosity, stability and solubility in water.

The area within the triangle covers those ratios of partial ester and glycerine necessary to obtain clear solutions. Points outside the triangular area represent mixtures which are undesirable in that they are cloudy, multi-phase, gel-like or which are commercially unfeasible since the amount of the oleaginous fraction is too low. In vitaminiferous compositions particularly it is preferred that the oleaginous fraction comprise not less than about 2% by weight of the total composition while, based on the weight of the four essential ingredients only, the weight of the oleaginous component in the compositions of the invention is actually not less than about 4% by weight.

The triangular area indicated in Fig. 1 is applicable to fish liver oils, as, for example, cod liver oil, shark liver oil, halibut liver oil, and other oils of this nature.

As can be seen from this graph, the minimum amount of partial ester which can be used is about 3 parts by weight while the maximum is about 13 parts by weight. The minimum amount of glycerol which can satisfactorily be used is about 0.1 part by weight and the maximum is about 9 parts by weight, the amount being dependent upon the amount of ester used. Preferably small amounts of partial ester should be selected in order to avoid objectionable taste. Having selected a desired amount of partial ester to be used, the amount of glycerol needed can be obtained and, having thus obtained the necessary information with regard to glycerol, the proper amount of water to be used can then be found as will be more fully explained hereinbelow.

It has been discovered that a definite relationship exists for the aqueous phase, namely, between the glycerol and the water in the various compositions tested which must be substantially maintained in order to achieve the desired objects. This relationship can be expressed by the formula $W=11-G$ where G stands for the parts by weight of glycerol and W stands for the minimum amount of water necessary to obtain a clear composition. This amount should not be greatly exceeded in preparing the composition since an excessive amount of water, while still yielding a clear solution, would result in mixing difficulties. It should be emphasized that once the composition is prepared, it is infinitely soluble in water. This water-glycerol relationship has been found to hold true for all oleaginous compositions tested, covering fish, animal and vegetable oil components and applies not only to vitamin compositions but to other oleaginous compositions containing sorbitan monooleate (ethylene oxide)$_{20}$.

As an example illustrating the proper use of the graph, we will assume that one wishes to obtain a clear, stable, water-soluble composition containing a fish liver oil. To one part of oil, if one selects 5 parts of ester, there is needed between about 7.2 to about 9 parts of glycerol, by weight. To find the amount of water necessary, one merely takes the weight of glycerine selected and subtracts this amount from 11. This gives the parts by weight of water required in the composition. Thus, for 7.2 parts by weight of glycerol, one requires approximately 3.8 parts of water.

While the graph illustrated in Fig. 1 is helpful in quickly obtaining the necessary information, a mathematical relationship between the oil, ester and glycerol has also been derived which can be used in lieu of the graph. This relationship is expressed hereinbelow.

A clear, stable, substantially water-soluble composition may be obtained with fish oil when not less than about 3 or more than about 13 parts of partial ester is used for each part by weight of oil and not less than about 0.1 and not more than 9 parts of glycerol by weight. Under these conditions, the minimum required amount of glycerol may be calculated by the formula $G=9.0-C(S-M)$ where G and S stand for the parts by weight of glycerol and sorbitan monooleate (ethylene oxide)$_{20}$, respectively, C is a constant whose numerical value may be obtained by dividing the operable amount of glycerol permitted in the composition by the operable amount of partial ester permitted and M is a number equal to the minimum amount of partial ester that may be used with the maximum amount of glycerol permitted in the composition. This formula is valid for any oil soluble in the partial ester. It is obvious that this formula may also be stated as $S=M+K(9-G)$ where $$K=\frac{1}{C}$$

the other designations having the same meaning as indicated above. By operable amount is meant the numeral value obtained by subtracting the least amount of an ingredient that can be used from the most that can be used, these amounts being determined from the characteristics of the oil selected, as shown by the drawings.

For fish liver oil specifically, the formula is $G=9.00-.89(S-3)$. Having obtained the amount of glycerol needed, the minimum amount of water necessary to obtain a clear solution is calculated by the formula $W=11-G$, as indicated above.

Figure 2:
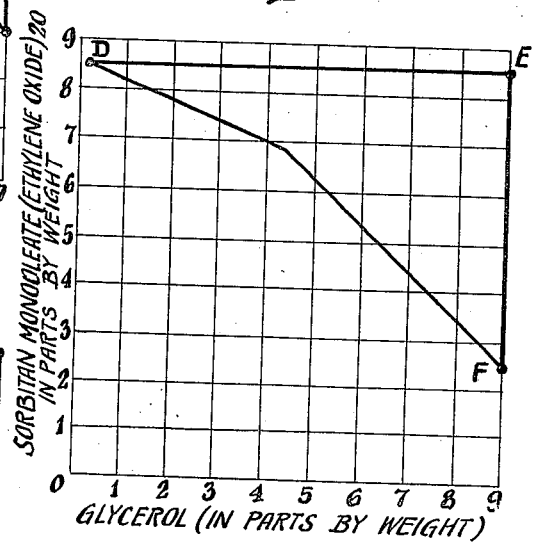

With regard to compositions containing distilled fractions of fish liver oil, attention is called to Fig. 2. This figure illustrates the proportions of sorbitan monooleate (ethylene oxide)$_{20}$ and glycerol required to achieve clear compositions on the basis of one part of an oil fraction of this type containing from about 200,000 to about 500,000 U. S. P. units of vitamin A per gram in the composition.

As in the case of Fig. 1, Fig. 2 discloses a graph in which the abscissa represents the parts by weight of gycerol while the ordinate represents the parts by weight of partial ester; the lines D, E and F outlining a substantially triangular area.

By the use of this graph, we may prepare clear, stable compositions containing distilled oil fractions of fish origin, selecting either the desired amount of glycerol or ester to be used and finding the proper ratios of corresponding components, including the water component. The substantially triangular area covers those ratios of ester and glycerol necessary to obtain clear solutions. Points outside the area represent undesirable compositions which are either too viscous, or are cloudy or are unstable.

Illustrative of the use of the Fig. 2 graph, a composition containing one part of distilled natural vitamin A ester can be made stable and water-soluble by using 4 parts by weight of ester, from about 7.4 to about 9 parts by weight of glycerol and about 2 to about 3.6 parts by weight of water, the latter depending upon the amount of glycerol selected, and calculated from the relationship hereinabove indicated.

Again, as in the case of compositions containing whole, unfractionated fish liver oils, mathematical relationships have been derived which can be used in lieu of the graph when dealing with compositions containing distilled oil fractions, especially those obtained by high vacuum, substantially molecular distillation.

Firstly, on the basis of one part of such oil, from about 2.5 to not more than about 8.5 parts by weight of sorbitan monooleate (ethylene oxide)$_{20}$, and from about 0.1 to not more than about 9 parts of glycerol, should be used. When one uses from about 2.5 to about 6.9 parts of partial ester, the minimum amount of glycerol that may be used may be calculated from the formula, $G=9.0-1.035(S-2.5)$, where G and S stand for the parts by weight of glycerol and partial ester, respectively. When operating in the higher ranges of partial ester, from about 7 to about 8.5 parts of ester, the minimum amount of glycerol that may be used is calculated by the formula $G=9.0-2.7(S-5.2)$, G and S having the same meaning as indicated above. Having obtained the amount of glycerol to be used, the minimum amount of water necessary is calculated in the manner aforesaid.

Figure 3:
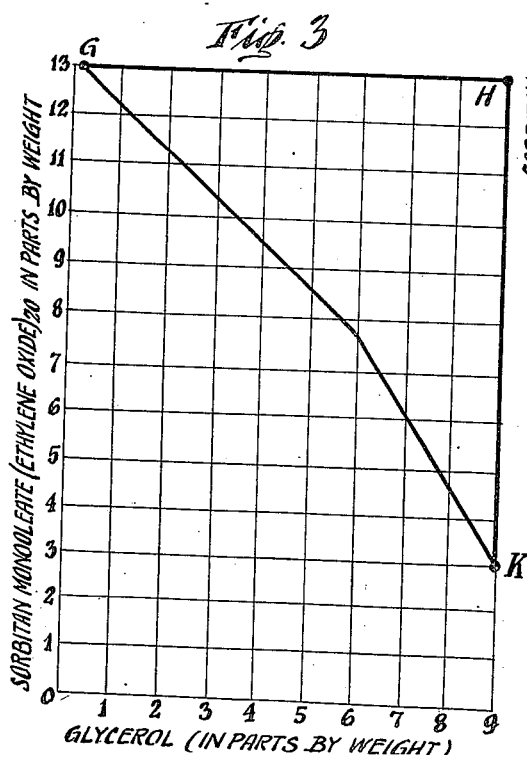

Fig. 3 illustrates a graph for vegetable oil showing the area within which one may select amounts of partial ester and glycerol to obtain clear solutions when the proper amount of water is added. As indicated, the abcissa represents the parts by weight of glycerol while the ordinate represents the parts by weight of partial ester. The area is approximately triangular in shape, formed by the lines G, H and K.

By means of the Fig. 3 graph, one may prepare clear, stable compositions containing vegetable oils. The graph is useful for such oils regardless of the vegetable oil source. As indicated with respect to Figs. 1 and 2, the points selected within the area will, with the proper amount of water, yield clear stable solutions which seem to be capable of infinitely diluting with water or in fact any aqueous media. As stated before, points outside the area represent undesirable compositions which may be either cloudy, unstable and separable into layers, or unduly viscous for practical purposes.

As in the cases above illustrated, mathematical relationships have been derived which may be used in lieu of Fig. 3.

Thus, on the basis of one part of the selected vegetable oil, from about 3 to not more than about 13 parts by weight of sorbitan monooleate (ethylene oxide)$_{20}$ and from about 0.1 to not more than about 9 parts by weight of glycerol, should be used. When one selects from 3 to about 7.6 parts of partial ester, the minimum amount of glycerol that may be used may be calculated from the formula, $G=9.0-0.636(S-3)$, where G and S stand for the parts by weight of glycerol and partial ester, respectively. Operating in the higher ranges of partial ester, from about 7.7 to about 13 parts by weight, the minimum amount of glycerol that may be used is calculated from the formula $G=9.0-1.11(S-5)$, G and S having the same meaning as indicated above. Having obtained the minimum amount of glycerol, the maximum amount not being over 9, as aforesaid, the minimum amount of water necessary is calculated by subtracting the amount of glycerol from 11, as in the case of the other oil compositions.

The graphs shown in the drawing can be obtained by making up a series of compositions which establish the limits of the separate ingredients. To determine specific points, compositions are made up of oil and a selected amount of ester. To these compositions varying amounts of glycerol and water are added until clear solutions are produced.

Those compositions showing clear solutions to the naked eye establish the points from which a graph may be prepared.

A study of prepared graphs results in the derivation of another important relationship which has been found to hold true for all of the oleaginous compositions tested, regardless of the character of the oil component in the admixture. Considering the partial ester and the oil to comprise the oleaginous component and the glycerol and water to comprise the aqueous component of the composition, it has been found that clear solutions are obtained when the ratio of aqueous to oleaginous component is not greater than about 3:1.

The following specific examples further illustrate the invention:

Example I 4.39 gram of shark liver oil having a potency of 145,460 U. S. P. units of vitamin A per gram with intimately mixed with 52.63 grams of sorbitan monooleate (ethylene oxide)$_{20}$ by stirring for several minutes in an atmosphere of nitrogen gas. (The number after the ethylene oxide indicates the number of mols of the alkylene oxide to a mol of the monooleate.) To the mixture so prepared was added 8.77 grams of glycerin and this was once again stirred in an atmosphere of nitrogen gas for several minutes. A very noticeable emulsion results. To this emulsion or cloudy mixture was added with stirring in an atmosphere of nitrogen gas 39.48 grams of distilled air-free water to make a total volume of 100 ml. A clear, yellow colored solution was obtained which remained clear indefinitely. The solution so prepared assays in excess of 6,300 U. S. P. units of vitamin A per ml. of solution.

This solution so made can be further diluted with water to give clear solutions without forming emulsions or visible dispersion. The solution is suitable for oral use as a source of dietary vitamin A. Also, the aqueous solution may be diluted with milk, soup, fruit juice, or other beverage for dietary use.

Example II 6.87 grams of cod liver oil having a potency of 2,000 U. S. P. units of vitamin A per gram and 200 U. S. P. units of vitamin D per gram, was intimately mixed with 30.92 grams of sorbitan monooleate (ethylene oxide)$_{20}$ by stirring for several minutes in an atmosphere of nitrogen gas. To the mixture so prepared was added 58.4 grams of glycerin and once again stirred intimately for several minutes in an atmosphere of nitrogen gas. A very noticeable emulsion results. To this emulsion or cloudy mixture, was added with stirring in an atmosphere of nitrogen gas, 17.17 grams of distilled air-free water to make a total volume of 100 ml. A clear, light yellow colored solution was obtained which remained clear indefinitely. The solution so prepared contains in excess of 130 U. S. P. units of vitamin A per ml. and 13 U. S. P. units of vitamin D per ml.

This solution so made can be further diluted with water to give clear solutions without forming emulsions or visible dispersion.

Example III 4.96 grams of halibut liver oil having a potency of 86,300 U. S. P. units of vitamin A per gram was intimately mixed with 49.63 grams of sorbitan monooleate (ethylene oxide)$_{20}$ by stirring for several minutes in an atmosphere of nitrogen gas. To the mixture so prepared, was added 29.78 grams of glycerin and once again stirred for several minutes in an atmosphere of nitrogen gas. A very noticeable emulsion results. To this emulsion or cloudy mixture was added with stirring, in an atmosphere of nitrogen gas, 24.82 grams of distilled air-free water to make a total volume of 100 ml. A clear yellow colored solution was obtained which remained clear indefinitely. The solution so prepared assays in excess of 4,200 U. S. P. units of vitamin A per ml. of solution.

This solution so made can be further diluted with water to give clear solutions without forming emulsions or visible dispersion.

This solution is suitable for use as a means of vitamin A fortification of cattle and poultry feeds and also provides a cheap source of the vitamin A. Heretofore, it has been difficult to incorporate adequate amounts of vitamin A, as the ratio of vitamin A oil used for incorporation in the desired feed has been very small and proper incorporation of the oil in the feed was very difficult and very poor distribution of vitamin A was achieved. By the use of a water soluble product such as mentioned above, the material can be easily sprayed on to the feed and by proper mixing, even distribution of the vitamin A in the feed is achieved. The potency of the above-mentioned product may be adjusted to the vitamin level of the product, in which it is to be incorporated.

The solution is also suitable for oral use as a source of dietary vitamin A.

Example IV

To 13.5 ml. of water was added 0.20 gram of thiamine hydrochloride, 0.10 gram of pyridoxine hydrochloride, 5.00 grams of ascorbic acid and 1.50 gram of nicotinic acid amide. The solution was heated at a temperature of 40° C. with stirring, in the absence of light, until solution was complete. This solution was cooled to 25° C. and labeled solution I.

To 2 ml. of water was added 0.05 gram of riboflavin with constant stirring. 0.05 ml. of 10 normal sodium hydroxide solution was added to this aqueous riboflavin suspension and stirred in the absence of light until solution of the riboflavin was complete. This clear solution of riboflavin was added to solution I and intimately stirred in the absence of light until a clear solution was effected.

To 5.0 gram of tuna liver oil, having a potency of 201,000 U. S. P. units of vitamin A per gram and 20,000 U. S. P. units of vitamin D per gram and 1.0 gram of viosterol in oil having a potency of 200,000 U. S. P. units of vitamin D per gram and 0.40 gram of distilled concentrate of d, alpha tocopheryl acetate, prepared by distillation from acetylated tocopherol concentrates prepared from vegetable oils and standardized to contain 250 milligrams of d, alpha tocopheryl acetate per gram, was added 31.95 grams of sorbitan monooleate (ethylene oxide)$_{20}$. This mixture was intimately mixed by stirring for several minutes in an atmosphere of nitrogen. To the mixture so prepared was added 54.40 grams of glycerin and once again stirred in an atmosphere of nitrogen gas for several minutes. A very noticeable emulsion results and this mixture is labeled solution II.

To solution II which is cloudy is added solution I with constant stirring in an atmosphere of nitrogen gas. After stirring for several minutes, a clear solution results, 0.45 ml. of 10 normal sodium hydroxide solution was added with stirring to this solution and finally, if necessary, distilled water in amount to make a total of 100 ml.

All of the above operations were carried out in an inert atmosphere of a gas such as nitrogen as a precautionary measure but such an operation is not essential to the operation of the invention in a successful manner.

The final solution having a pH of 4.0 is a light amber colored solution which is perfectly clear and remains clear indefinitely.

The above solution contains vitamin potencies of the following per ml.:

| | | |
|---|---|---|
| Vitamin A | U. S. P. units | 10,000 |
| Vitamin D | do | 3,000 |
| d, Alpha tocopheryl acetate | milligram | 1.00 |
| Thiamine hydrochloride | milligrams | 2.00 |
| Riboflavin | milligram | 0.50 |
| Pyridoxine hydrochloride | do | 1.00 |
| Ascorbic acid | milligrams | 50.00 |
| Niacin amide | do | 5.00 |

The above solution is completely miscible when added to water, milk, fruit juices and other aqueous foods or beverages without the development of turbidity and does not deposit insoluble oil droplets on standing. It serves as the ideal medium for incorporating the lipoid soluble and also the water soluble vitamins for dietary, prophylactic or therapeutic purposes.

The above mentioned solution assayed 4 months after preparation showed no significant loss of potency of any of the vitamins, indicating a high degree of stability.

Example V 7.75 grams of distilled vitamin A ester having a potency of 500,000 units of vitamin A per gram was intimately mixed with 21.70 grams of sorbitan monooleate (ethylene oxide)$_{20}$ by stirring for several minutes in an atmosphere of nitrogen gas.

To the mixture so prepared was added 68.20 grams of glycerin and once again stirred intimately for several minutes in an atmosphere of nitrogen gas. A very noticeable emulsion results. To this emulsion or cloudy mixture was added with stirring in an atmosphere of nitrogen gas, 17.05 grams of distilled air-free water to make a total volume of 100 ml. A clear, yellow colored solution was obtained which remained clear indefinitely. The solution so prepared contains in excess of 38,000 U. S. P. units of vitamin A per ml.

This solution so made can be further diluted with water to give clear solutions without forming emulsions or visible dispersion. The solution is suitable for oral use as a source of dietary vitamin A. Also, the aqueous solution may be diluted with milk, soup, fruit juice or other beverage for dietary use.

*Example VI*

5.29 grams of distilled vitamin A ester having a potency of 200,000 U. S. P. units of vitamin A per gram was intimately mixed with 42.32 grams of sorbitan monooleate (ethylene oxide) 20 by stirring for several minutes in an atmosphere of nitrogen gas. To the mixture so prepared was added 15.87 grams of glycerin and once again stirred intimately for several minutes in an atmosphere of nitrogen gas. A very noticeable emulsion results. To this emulsion or cloudy mixture was added with stirring in an atmosphere of nitrogen gas, 42.32 grams of distilled air-free water to make a total volume of 100 ml. A clear, yellow colored solution was obtained which remained clear indefinitely. The solution so prepared contains in excess of 10,000 U. S. P. units of vitamin A per ml.

This solution so made can be further diluted with water to give clear solutions without forming emulsions or visible dispersion. The solution is suitable for use as a source of dietary vitamin A.

*Example VII*

To 15.0 ml. of water was added 0.20 gram of thiamine hydrochloride, 0.10 gram of pyridoxine hydrochloride, 5.00 gram of ascorbic acid and 0.50 gram of nicotinic acid amide. The solution was heated at a temperature of 40° C. with stirring, in the absence of light, until solution was complete. This solution was cooled to 25° C. and labeled solution I.

To 2 ml. of water was added 0.05 gram of riboflavin with constant stirring. 0.05 ml. of 10 normal sodium hydroxide solution was added to this aqueous riboflavin suspension and stirred in the absence of light until solution of the riboflavin was complete. This clear solution of riboflavin was added to solution I and intimately stirred in the absence of light until a clear solution was effected.

To 2.0 grams of distilled vitamin A ester having a potency of 500,000 U. S. P. units of vitamin A per gram and 1.0 gram of viosterol in oil having a potency of 200,000 U. S. P. units of vitamin D per gram and 0.40 gram of distilled concentrate of d, alpha tocopheryl acetate, prepared by distillation from acetylated tocopherol concentrates prepared from vegetable oils and standardized to contain 250 milligrams of d, alpha tocopheryl acetate per gram, was added 25.84 grams of sorbitan monooleate (ethylene oxide) 20. This mixture was intimately mixed by stirring for several minutes in an atmosphere of nitrogen. To the mixture so prepared was added 20.40 grams of glycerin and once again stirred in an atmosphere of nitrogen gas for several minutes. A very noticeable emulsion results and this mixture is labeled solution II.

To solution II which is cloudy is added solution I with constant stirring in an atmosphere of nitrogen gas. After stirring for several minutes, a clear solution results. 0.45 ml. of 10 normal sodium hydroxide solution was added with stirring to this solution and finally distilled water in amount to make a total of 100 ml.

All of the above operations were carried out in an inert atmosphere of a gas such as nitrogen as a precautionary measure but such an operation is not essential to the operation of the invention in a successful manner.

The final solution having a pH of 4.0 is a yellow colored solution which is perfectly clear and remains clear indefinitely.

The above solution contains vitamin potencies of the following per ml.:

| | | |
|---|---|---|
| Vitamin A | U. S. P. units | 10,000 |
| Vitamin D | do | 2,000 |
| d, Alpha tocopheryl acetate | milligrams | 1.0 |
| Thiamine hydrochloride | do | 2.00 |
| Riboflavin | do | 0.50 |
| Pyridoxine hydrochloride | do | 1.00 |
| Ascorbic acid | do | 50.00 |
| Niacin amide | do | 5.00 |

The above solution is completely miscible when added to water, milk, fruit juices and other aqueous foods or beverages without the development of turbidity and does not deposit insoluble oil droplets on standing. It serves as the ideal medium for incorporating the lipoid soluble and also the water soluble vitamins for dietary, prophylactic or therapeutic purposes.

The above mentioned solution assayed 4 months after preparation showed no significant loss of potency of any of the vitamins, indicating a high degree of stability.

*Example VIII*

To 6.12 grams of distilled vitamin A ester containing 500,000 U. S. P. units of vitamin A per gram and 0.50 gram of viosterol in oil containing 1,000,000 U. S. P. units of vitamin D per gram, and 1.0 gram of distilled concentrate of d, alpha tocopheryl acetate, prepared by distillation from acetylated tocopherol concentrates prepared from vegetable oils and standardized to contain 250 milligrams of d, alpha tocopheryl acetate per gram, was added 22.86 grams of sorbitan monooleate (ethylene oxide) 20. This mixture was intimately mixed by stirring for several minutes. To the mixture so prepared was added 66.29 grams of glycerin and once again stirred intimately for several minutes. A very noticeable emulsion results. To this emulsion or cloudy mixture was added with constant stirring, 17.52 grams of distilled water to make a total volume of 100 ml. A clear, light amber colored solution was obtained and remained clear indefinitely.

This solution contained vitamin potencies of the following per ml.:

| | | |
|---|---|---|
| Vitamin A | U. S. P. units | 30,600 |
| Vitamin D | do | 5,000 |
| d, Alpha tocopheryl acetate | milligrams | 2.5 |

This solution is completely miscible in all proportions when added to water, milk, fruit juices and other aqueous foods or beverages. It serves as an ideal medium for incorporating the lipoid soluble vitamins for dietary, prophylactic or therapeutic purposes.

Example IX

To 6.54 grams of distilled vitamin A ester having a potency of 200,000 U. S. P units of vitamin A per gram and 0.60 gram of viosterol in oil having a potency of 1,000,000 U. S. P. units of vitamin D per gram, was added 27.13 grams of sorbitan monooleate (ethylene oxide)$_{20}$. This mixture was intimately stirred for several minutes. To the mixture was added with stirring 57.12 grams of glycerin. A very noticeable emulsion results. To this emulsion or cloudy mixture was added with stirring 21.42 grams of distilled water. A clear yellow colored solution was obtained which remained clear indefinitely. This solution so prepared contains 13,000 U. S. P. units of vitamin A per ml. and 6,000 U. S. P. units of vitamin D per ml.

This solution so made can be further diluted with water to give clear solutions without forming emulsions or visible dispersion. The solution is suitable for oral use as a source of dietary vitamins A and D. Also, the aqueous solution may be further diluted with either water or aqueous mixtures of glycerin or sugar or other flavoring agents to increase the palatability of the preparation. In addition, the preparation may be diluted with milk, soup, fruit juices or other beverage for dietary use.

Example X

To 5.0 grams of distilled vitamin A ester containing 200,000 U. S. P. units of vitamin A per gram and 1.0 gram of viosterol in oil containing 200,000 U. S. P. units of vitamin D per gram, was added with stirring for several minutes, 37.5 grams of sorbitan monooleate (ethylene oxide)$_{20}$. To this mixture was added with constant stirring for several minutes, 45.0 grams of glycerin. A very noticeable emulsion results. This mixture is labeled solution I.

To 20.5 grams of distilled water was added 5.0 grams of ascorbic acid and the mixture was stirred until a clear solution resulted. This clear solution was added to solution I with constant stirring for several minutes. A clear solution was obtained. To this clear solution was added 0.5 ml. of 10 normal sodium hydroxide solution with constant stirring for several minutes.

The final solution, having a pH of 4.0 is a yellow colored solution which is perfectly clear and remains so indefinitely. This solution so prepared contains vitamin potencies of the following per ml.:

| | | |
|---|---|---|
| Vitamin A | U. S. P. units | 10,000 |
| Vitamin D | do | 2,000 |
| Ascorbic acid | milligrams | 50.0 |

The solution is completely miscible in all proportions when added to water, milk, fruit juices and other aqueous foods or beverages without the development of turbidity and does not deposit oil droplets on standing.

Example XI 5.50 grams of U. S. P. corn oil was intimately mixed with 44.0 grams of sorbitan monooleate (ethylene oxide)$_{20}$ by stirring for several minutes. To the mixture so prepared was added 35.75 grams of glycerin and this was once again stirred for several minutes. A very noticeable emulsion results. To this emulsion or cloudy mixture was added with stirring, 24.75 grams of distilled water to make a total volume of 100 ml. A stable, clear, light yellow colored solution was obtained which remained clear indefinitely.

This solution so made can be further diluted with water to give clear solutions without forming emulsions or visible dispersion.

Example XII 5.07 grams of U. S. P. sesame oil was intimately mixed with 50.70 grams of sorbitan monooleate (ethylene oxide)$_{20}$ by stirring for several minutes. To the mixture so prepared was added 40.56 grams of glycerin and this was once again stirred for several minutes. A very noticeable emulsion results. To this emulsion or cloudy mixture was added with stirring 15.21 grams of distilled water to make a total volume of 100 ml. A clear, stable, light yellow colored solution was obtained which remained clear indefinitely.

This solution so made can be further diluted with water to give clear solutions without forming emulsions or visible dispersion.

Example XIII

To 7.13 grams of U. S. P. peanut oil containing 0.0998 gram of menadione (2-methyl-napthoquinone) was added 28.52 grams of sorbitan monooleate (ethylene oxide)$_{20}$ with intimate stirring in the absence of light for several minutes. To the mixture so prepared was added 62.74 grams of glycerin and this was once again stirred for several minutes in the absence of light. A very noticeable emulsion results. To this emulsion or cloudy mixture was added with stirring in the absence of light, 15.69 grams of distilled water to make a total volume of 100 ml. A clear, light yellow colored solution was obtained which remained clear indefinitely.

The resulting solution contains approximately 1 milligram of menadione per ml. of solution and is suitable for use in the prevention and treatment of hypoprothrombinemia and associated hemmorhagic diseases in newborn infants, in preoperative and postoperative treatment of patients with obstructive jaundice.

Since the stability of menadione in aqueous solution is relatively poor, this example is intended for purposes of illustration whereby the solubility in water of a normally oil soluble compound is greatly increased through the use of our invention. Also, the stability of menadione, in a media such as described above, may be good due to the presence of the oil in which it is initially dissolved. This point could be investigated.

Also, solutions such as that described above could be prepared for immediate use only to achieve a water-soluble product.

Example XIV

To 7.1 grams of U. S. P. cottonseed oil containing 1.420 grams of synthetic alpha tocopherol was added 28.4 grams of sorbitan monooleate (ethylene oxide)$_{20}$ with intimate stirring. To the mixture so prepared, 60.35 grams of glycerin was added with constant stirring for several minutes. A very noticeable emulsion results. To this emulsion or cloudy mixture was added with stirring 17.75 grams of distilled water to make a total volume of 100 ml. A clear, yellow colored solution was obtained and remained clear indefinitely. The solution so prepared contains in excess of 14 milligrams of alpha tocopherol per ml. of solution.

This solution so made can be further diluted with water to give clear solutions without forming emulsions or visible dispersion. This solution

Example XV 5.00 grams of viosterol in U. S. P. sesame oil containing 1,000,000 U. S. P. units of vitamin $D_2$ per gram was intimately mixed for several minutes, with 48.20 grams of sorbitan monooleate (ethylene oxide)20. To the mixture so prepared 25.0 grams of glycerin was added with constant stirring. A very noticeable emulsion results. To this emulsion or cloudy mixture was added with stirring, 30.00 grams of distilled water. A clear, light yellow colored solution was obtained which remained clear indefinitely. The solution so prepared contains 50,000 U. S. P. units of vitamin $D_2$ per ml.

The solution is suitable for use as a source of therapeutic and prophylactic vitamin $D_2$. The solution may be further diluted in water to give clear solutions, without forming emulsions or visible dispersion. Also the aqueous solution may be diluted in milk, soup, fruit juice, or other beverage for dietary use.

Example XVI

To 5.52 grams of U. S. P. sesame oil containing 110.4 milligrams of diethylstilbestrol, was added 44.16 grams of sorbitan monooleate (ethylene oxide)20 and stirred intimately for several minutes. To this mixture was added 38.64 grams of glycerin. Once again this mixture was stirred for several minutes. A very noticeable emulsion results. To this emulsion or cloudy mixture was added 22.08 grams of distilled water and stirred for several minutes. A clear light yellow colored solution was obtained which remained clear indefinitely. The solution so prepared contains in excess of 1 milligram of diethylstilbestrol per ml. of solution.

The solution so made may be further diluted with water to give clear solutions without forming emulsions or visible dispersion.

Example XVII

To 6.86 grams of carotene in cottonseed oil (a carotene-(pro-vitamin A) concentrate derived from vegetable oils and standardized to contain not less than 48,000 U. S. P. units of vitamin A activity per gram) was added with stirring for several minutes in the absence of light, 34.30 grams of sorbitan monooleate (ethylene oxide)20. To this mixture, was also added, with stirring in the absence of light, 56.25 grams of glycerin. A very noticeable emulsion results. To this emulsion or cloudy mixture, was added with stirring in the absence of light, 15.78 grams of distilled water. A clear, red colored solution was obtained which remained clear indefinitely. The solution so made assays in excess 3,000 U. S. P. units of vitamin A activity per ml. of solution.

This solution may be diluted with water to give clear solutions without forming emulsions or visible dispersions.

The solution is suitable for use as a source of dietary vitamin A and also as a means of vitamin A fortification of cattle and poultry feeds.

Example XVIII 0.25 gram of ephedrine alkaloid was dissolved in 5.47 grams of U. S. P. cottonseed oil. To this solution was added with stirring for several minutes 43.74 grams of sorbitan monooleate (ethylene oxide)20. To this mixture, 32.80 grams of glycerin was added and stirred for several minutes. A very noticeable emulsion results. To this emulsion or cloudy mixture, was added with stirring, 27.33 grams of distilled water to make a total volume of 100 ml. A clear, light yellow colored solution was obtained which remained clear indefinitely.

The solution so prepared, can be further diluted with water to give clear solutions without forming emulsions or visible dispersions. The solution is suitable for use as a vasoconstrictor.

Example XIX 5.47 grams of a liquid oil soluble chlorophyll preparation was intimately mixed with 43.74 grams of sorbitan monooleate (ethylene oxide)20, by stirring for several minutes. To the mixture so prepared was added 32.80 grams of glycerin and stirred for several minutes. A very noticeable cloudy gelatinous gel forms. To this cloudy gel was added with stirring, 27.33 grams of distilled water to make a final volume of 100 ml. A clear dark green colored solution was obtained which remained clear indefinitely.

This solution so made can be further diluted with water to give clear solutions without forming emulsion or visible dispersion. The solution is suitable for use as a spray or solution for a wet dressing to promote healing and stimulate normal cell growth.

Example XX

To 4.5 grams of U. S. P. cottonseed oil and 0.5 gram of oil of eucalyptus, was added 0.50 gram of chlorothymol, 0.50 gram of camphor and 0.50 gram of chlorobutanol. This mixture was stirred with the aid of gentle heat (about 35°) until a clear solution resulted. To the solution so made was added with stirring for several minutes 45.0 grams of sorbitan monooleate (ethylene oxide)20. 26.16 grams of glycerin were added to the mixture and stirred for several minutes. A cloudy emulsion results. To this cloudy mixture or emulsion was added 28.85 grams of distilled water and stirred until a clear, light yellow colored solution was obtained. To this clear solution was added enough distilled water in amount to make 100 ml.

This solution so made can be further diluted with water to give clear solutions without forming emulsions or visible dispersions. This solution is suitable for use as an aromatic nasal spray or drop.

While glycerol has been used in the specific illustrations of the composition, since this is the preferred ingredient, other polyhydric alcohols may be used in place thereof as has been pointed out above. In addition, as has already been mentioned, various sugars may be used in place of glycerol.

It should be mentioned that many changes and modifications may be made without departing from the spirit of the inventive concept. While the basic elements of the composition have been shown to be an oil, a polyhydric alcohol or a sugar, water and sorbitan monooleate (ethylene oxide)20, other substances may be added, when desired, provided they are compatible with the basic ingredients. Thus, vitamins, vasoconstrictors or, in fact, medicaments in general, coloring agents, flavoring agents, inert or active ingredients may be present in the final compositions.

When mixing those ingredients which easily deteriorate, such as vitamins, it is preferred to carry out such mixing operations in the absence of light and in the presence of an inert gas such as nitrogen. Also, as an added precaution, particularly with oxygen-sensitive ingredients, one should also use distilled air-free water. While these precautions are, of course, desirable, it should be noted that they are not essential in carrying out the invention.

Having described our invention, what we claim is:

1. A composition of matter comprising a clear solution of a glyceride oil, sorbitan monooleate (ethylene oxide)$_{20}$, glycerol and water wherein for each part by weight of oil there is present 11 parts combined weight of glycerol and water, there being not less than 0.1 and not more than about 9 parts by weight of glycerol in the composition while the amount of partial ester may be calculated from the formula $S = M + K(9-G)$ wherein S and G stand for the parts by weight of partial ester and glycerol respectively while M stands for the minimum amount of partial ester that may be used with the maximum amount of glycerol permitted in the compositions and K is a value equal to the operable amount in parts by weight of partial ester permitted in the composition divided by the operable amount in parts by weight of glycerol permitted in the composition.

2. A clear, stable composition of matter comprising a clear solution of an oil having a substantial proportion of fatty acid glycerides together with vitamin A ester, sorbitan monooleate (ethylene oxide)$_{20}$, glycerol and water, wherein for each part by weight of oil, the water is present in parts by weight not less than about 11 minus the parts by weight of glycerol, the latter being present in an amount ranging from about 0.1 to 9 parts by weight, said partial ester being present in not less than about 3 or not more than about 13 parts by weight, and the weight ratio of aqueous component comprising the water and glycerol to oleaginous component comprising the oil and partial ester being not greater than about 3:1.

3. A clear, stable composition of matter comprising a clear solution of a glyceride, oil, water, glycerol and sorbitan monooleate (ethylene oxide)$_{20}$, wherein for each part by weight of oil there is present not less than about 2.5 and not more than about 13 parts by weight of the partial ester, not less than about 0.1 and not more than about 9 parts by weight of glycerol with not less than about 2 parts by weight of water.

4. The composition of claim 3; wherein the oil is fish liver oil containing a lipoid-soluble vitamin.

5. A clear, stable composition of matter comprising a clear solution of fish liver oil, sorbitan monooleate (ethylene oxide)$_{20}$, glycerol and water, wherein for each part by weight of fish liver oil, there is not less than about 3 or more than about 13 parts by weight of partial ester, the amount of glycerol being not more than about 9 parts by weight and being not less that amount found by the relationship $G = 9 - 0.89$ (parts by weight of partial ester $-3$) where G stands for the parts by weight of glycerol, the amount of water being not less than about 11 minus the amount of glycerol in the composition.

6. A clear, stable composition of matter comprising a clear solution of a distilled oil fraction of natural vitamin A ester obtained from fish liver oil, sorbitan monooleate (ethylene oxide)$_{20}$, glycerol and water, wherein for each part by weight of distilled oil fraction there is not less than about 2.5 or more than about 8.5 parts by weight of partial ester, and not less than about 0.1 part of glycerol or more than 9 parts by weight, with not less than about 2 parts by weight of water.

7. A clear, stable composition of matter comprising a clear solution of a distilled oil fraction of natural vitamin A ester obtained from fish liver oil, sorbitan monooleate (ethylene oxide)$_{20}$, glycerol and water, wherein for each part by weight of distilled oil fraction there is not less than about 2.5 or more than about 8.5 parts by weight of partial ester, the least amount of glycerol for the amount of partial ester used being found from the relationship $G = 9 - 1.035(S - 2.5)$ when S stands for the parts by weight of partial ester falling within the range of about 2.5 to about 6.9, and the relationship $$G = 9 - 2.7(S - 5.2)$$

when S stands for the parts by weight of partial ester falling within the approximate range of 7 to 8.5, G representing the parts by weight of glycerol; the composition containing not more than about 9 parts by weight of glycerol, and the amount of water being not less than about 11 minus the amount of glycerol in the composition.

8. A clear, stable composition of matter comprising a clear solution of a vegetable oil, sorbitan monooleate (ethylene oxide)$_{20}$, glycerol and water, wherein for each part by weight of distilled oil fraction there is not less than about 3 or more than about 13 parts by weight of partial ester, the least amount of glycerol for the amount of partial ester used being found from the relationship $G = 9 - 0.636(S - 3)$ when S stands for the parts by weight of partial ester falling within the range of about 3 to about 7.6, and the relationship $G = 9 - 1.11(S - 5)$ when S stands for the parts by weight of partial ester falling within the approximate range of 7.7 to 13, G representing the parts by weight of glycerol; the composition containing not more than about 9 parts by weight of glycerol and the amount of water being not less than about 11 minus the amount of glycerol in the composition.

9. A clear, stable composition of matter comprising a clear solution of a glyceride oil, the partial ester sorbitan monooleate (ethylene oxide)$_{20}$, glycerol and water, wherein for each part by weight of oil, the water is present in parts by weight not less than about 11 minus the parts by weight of glycerol, said partial ester being present in not more than about 13 parts by weight and not less than about 2.5 parts by weight, said glycerol being present in an amount of about 0.1 to 9 parts by weight, and the weight ratio of aqueous component comprising the water and glycerol to oleaginous component comprising the oil and partial ester being not greater than about 3:1.

10. A clear, stable composition of matter comprising a clear solution of fish liver oil, the partial ester sorbitan monooleate (ethylene oxide)$_{20}$, glycerol and water, wherein for each part by weight of oil, the water is present in parts by weight not less than about 11 minus the parts by weight of glycerol, the latter being present in an amount of about 0.1 to 9 parts by weight, said partial ester being present in not more than about 13 parts by weight and not less than about 3 parts by weight and the weight ratio of aqueous component comprising the water and glycerol to oleaginous component comprising the oil and partial ester being not greater than about 3:1.

11. A clear, stable composition of matter comprising a clear solution of a distilled, natural vitamin A ester fraction derived from fish liver oil, the partial ester sorbitan monooleate (ethylene oxide)20, glycerol and water, wherein for each part by weight of vitamin A ester, the water is present in parts by weight not less than about 11 minus the parts by weight of glycerol, the latter being present in an amount ranging from about 0.1 to 9 parts by weight, said partial ester being present in not more than about 8.5 parts by weight and not less than about 2.5 parts by weight, and the weight ratio of aqueous component comprising water and glycerol to oleaginous component comprising vitamin A ester and partial ester being not greater than about 3:1.

12. A clear, stable composition of matter comprising a clear solution of a vegetable oil, the partial ester sorbitan monooleate (ethylene oxide)20, glycerol and water, wherein for each part by weight of oil, the water is present in parts by weight not less than about 11 minus the parts by weight of glycerol, the latter being present in an amount of about 0.1 to 9 parts by weight, said partial ester being present in not more than about 13 parts by weight but not less than about 3 parts by weight and the weight ratio of aqueous component comprising the water and glycerol to oleaginous component comprising the oil and partial ester being not greater than about 3:1.

13. A clear, stable composition of matter comprising a clear solution of vitamin A in an oil containing a substantial proportion of fatty acid glycerides, sorbitan monooleate (ethylene oxide)20, glycerol and water, wherein for each part by weight of oil, the glycerol is present in an amount falling within the range of about 0.1 to 9 parts by weight, the water is present in parts by weight not less than about 11 minus the parts by weight of glycerol, said partial ester being present in not more than about 13 parts by weight and not less than about 2.5 parts by weight and the weight ratio of aqueous component comprising the water and glycerol to oleaginous component comprising the oil and partial ester being not greater than about 3:1.

CHARLES J. KERN.
THOMAS ANTOSHKIW.
MICHAEL R. MAIESE.

REFERENCES CITED

The following references are of record in the file of this patent:

UNITED STATES PATENTS

| Number | Name | Date |
|---|---|---|
| 2,167,144 | Barton | July 25, 1939 |
| 2,382,398 | Cordero | Aug. 14, 1945 |
| 2,402,373 | Cordero | June 18, 1946 |
| 2,407,624 | Bird | Sept. 17, 1946 |
| 2,417,299 | Freedman | Mar. 11, 1947 |

OTHER REFERENCES

Atlas Spans & Atlas Tweens, Nov. 1942, pp. 1, 7, 8. (Copy in Div. 43.)

Drug & Cosmetic Emulsions (1946), p. 4_ (Copy in Div. 43.)

Atlas Surface Active Agents, Pub. by Atlas Powder Co., Oct. 1948, page 21. (Copy in Div. 64.)

Pharmaceutical Journal, Dec. 20, 1947, page 450. (Copy in Div. 43.)